US012753869B2

(12) United States Patent
Kao

(10) Patent No.: US 12,753,869 B2
(45) Date of Patent: Oct. 6, 2026

(54) LIQUID COUPLER

(71) Applicant: Cooler Master Technology Inc., Taipei City (TW)

(72) Inventor: Chen Chou Kao, Taipei City (TW)

(73) Assignee: Cooler Master Technology Inc., Taipei City (TW)

( * ) Notice: Subject to any disclaimer, the term of this patent is extended or adjusted under 35 U.S.C. 154(b) by 0 days.

(21) Appl. No.: 19/001,550

(22) Filed: Dec. 25, 2024

(65) Prior Publication Data

US 2025/0207702 A1 Jun. 26, 2025

(30) Foreign Application Priority Data

Dec. 25, 2023 (TW) ................................ 112214112

(51) Int. Cl.
*F16L 37/133* (2006.01)
*F16L 37/098* (2006.01)

(52) U.S. Cl.
CPC ........... *F16L 37/133* (2013.01); *F16L 37/098* (2013.01)

(58) Field of Classification Search
CPC ... F16L 37/133; F16L 37/0847; F16L 37/098; F16L 37/12; F16L 25/0009; F16L 25/12; F16L 9/003
See application file for complete search history.

(56) References Cited

U.S. PATENT DOCUMENTS 3,245,703 A * 4/1966 Manly ................. F16L 37/0847
5,228,724 A * 7/1993 Godeau ................. F16L 37/098
5,568,946 A * 10/1996 Jackowski
5,897,142 A * 4/1999 Kulevsky
7,490,620 B2 * 2/2009 Tesluk
7,878,553 B2 * 2/2011 Wicks ................... F16L 37/098
10,823,321 B2 * 11/2020 Mao ...................... F16L 37/133
12,110,998 B2 * 10/2024 Gu ........................ F16L 37/098
2009/0200796 A1 * 8/2009 Lai ........................ F16L 37/098
2020/0149665 A1 * 5/2020 Dirneder

FOREIGN PATENT DOCUMENTS

DE 202011003140 U1 * 6/2011
WO WO-2010052386 A1 * 5/2010

OTHER PUBLICATIONS

WO-2010052386-A1—Machine Translation—English (Year: 2010).*
DE-202011003140-U1—Machine Translation—English (Year: 2011).*

* cited by examiner

*Primary Examiner* — William S. Choi
(74) *Attorney, Agent, or Firm* — Merchant & Gould P.C.

(57) ABSTRACT

A liquid coupler may include a first adaptor component, second adaptor component, fixing component, and plurality of connecting assemblies. A first liquid line is disposed through the first adaptor component and a second liquid line is disposed through the second adaptor component. Each plurality of connecting assemblies includes a locking component and receiving component. The locking component is coupled to the first adaptor component and the receiving component is coupled to the second adaptor component. The plurality of connecting assemblies is configured to enable the first liquid line to fluidly couple to the second liquid line via a pushing force. The fixing component is positioned between the first adaptor component and second adaptor component and when the first adaptor component is locked to the second adaptor component, the fixing component is configured to deform and fix the first liquid line to the first adaptor component.

17 Claims, 7 Drawing Sheets

LIQUID COUPLER

RELATED APPLICATIONS

This US application claims the benefit of priority to Taiwan application no. 112214112, filed on Dec. 25, 2023, of which is incorporated herein by reference in its entirety.

TECHNICAL FIELD

The present disclosure is related to thermal management of electronic systems in general and more particularly but not limited to liquid couplers.

BACKGROUND OF THE INVENTION

Liquid cooling systems are used in electronic systems in industries such as computing, data center, electric vehicle (EV) fast charging, telecom, laser, and medical equipment for thermal management. In data centers, in addition to air cooling, two types of liquid cooling techniques are used for servers, cold plate cooling (or direct-to-chip cooling (DTC) or direct liquid cooling (DLC)) and immersion cooling.

Cold plate cooling involves mounting of a cold plate directly on top of heat sources such as CPUs and GPUs. A working fluid inside of a cold plate chamber absorbs and transfers heat away from the integrated circuit components. Immersion cooling submerges the integrated circuit components in a dielectric immersion fluid, allowing for heat dissipation into the immersion fluid via direct contact.

Fundamental components of liquid cooling systems are liquid lines (or tubing or piping) as leakage of working fluid may cause servers to malfunction, fail and cause data center downtime. Increasing working fluid pressure and flow rate requirements due to increasing heat generation from faster and faster integrated circuit components exacerbate risks.

To meet increasing heat dissipation requirements, larger and heavier duty liquid lines may be used. Thus, with server racks arranged in the data center and servers arranged in a server rack, both, at close proximities, customized liquid lines, such as square liquid lines are being used for space efficiency. As a result, couplers connecting the square liquid lines to round liquid lines are being used. However, bulkier couplers or couplers requiring an expanded working area for operation of connecting and releasing a square liquid line to a round liquid line may negate some of the gains of the more efficient use of space. Moreover, couplers requiring special tools or multiple steps for set-up and/or connection and release between square to round liquid lines may increase time for maintenance of the server racks and servers.

SUMMARY OF THE INVENTION

The present disclosure provides an efficient connect and release, and minimal operational footprint liquid coupler for connecting a square liquid line to a round liquid line. A multitude of variations of square and round liquid lines can be available, making implementation and maintenance of customized liquid lines easier and more efficient.

In some aspects, the techniques described herein relate to a liquid coupler, including a first adaptor component, a second adaptor component, a fixing component, and a plurality of connecting assemblies. The first adaptor component includes a first opening. The first opening is disposed through the first adaptor component and configured to enable a first liquid line to be disposed therethrough. The second adaptor component includes a connection part. The connection part includes a second opening and is configured to enable the second adaptor component to be fixed to a second liquid line. The fixing component is positioned surrounding an outer surface of the first liquid line. Each plurality of connecting assemblies includes a locking component and a receiving component. The locking component is coupled to the first adaptor component and the receiving component is coupled to the second adaptor component. The plurality of connecting assemblies is configured to enable the first liquid line to fluidly couple to the second liquid line via a pushing force. The fixing component is positioned between the first adaptor component and the second adaptor component, and when the first adaptor component is locked to the second adaptor component, the fixing component is deformed and is configured to fix the first liquid line to the first adaptor component.

In some aspects, the techniques described herein relate to a liquid coupler, wherein the locking component includes a first locking component and a second locking component, and wherein the receiving component includes a first receiving component and a second receiving component. The first locking component is opposite the second locking component and the first receiving component is opposite the second receiving component. The first locking component includes a first deflection part and a first retaining part. The first deflection part has a first retaining end. The second locking component includes a second deflection part and a second retaining part. The second deflection part has a second retaining end. The first retaining part protrudes from the first retaining end and the second deflection part protrudes from the second retaining end. The first receiving component includes a first receiving part defining a first cavity and the second receiving component includes a second receiving part defining a second cavity. When the first adaptor component is locked to the second adaptor component, the first retaining part is inserted through the first cavity to abut the first receiving part and the second retaining part is inserted through the second cavity to abut the second receiving part to fluidly couple the first liquid line to the second liquid line via the pushing force.

In some aspects, the techniques described herein relate to a liquid coupler, wherein the first deflection part further includes a plurality of first positioning members and a plurality of first deflection part grooves, and wherein the second deflection part further includes a plurality of second positioning members and a plurality of second deflection part grooves. The plurality of first deflection part grooves is disposed in a second first row and the plurality of first positioning members is disposed in a first first row. The plurality of second deflection part grooves is disposed in a second second row and the plurality of second positioning members is disposed in a first second row. The plurality of first positioning members is configured to enable the first retaining part to stop from moving when inserted through the first cavity and the plurality of second positioning members is configured to enable the second retaining part to stop from moving when inserted through the second cavity.

In some aspects, the techniques described herein relate to a liquid coupler, further comprising a third sealant member, and wherein the second adaptor component further includes a second groove. The third sealant member is sealably positioned in the second groove. When the second adaptor component is fixed to the second liquid line and the first adaptor component is locked to the second adaptor component, the third sealant member is between the second groove and the first liquid line.

In some aspects, the techniques described herein relate to a liquid coupler, wherein the first adaptor component further includes a first inner wall, a second inner wall, a first side cover, and a second side cover. The first inner wall, the first side cover, the second inner wall, and the second side cover define the first opening.

In some aspects, the techniques described herein relate to a liquid coupler, wherein the first deflection part further includes a first attachment end, and the second deflection part further includes a second attachment end. The first attachment end is opposite the first retaining end and the second attachment end is opposite the second retaining end. The first deflection part extends outward from the first inner wall at the first attachment end. The second deflection part extends outward from the second inner wall at the second attachment end. The first attachment end and the second attachment end are configured to respectively enable deflection of the first deflection part and the second deflection part when the first retaining part is inserted through the first cavity and the second retaining part is inserted through the second cavity.

In some aspects, the techniques described herein relate to a liquid coupler, wherein the first inner wall includes a first wall perimeter edge and a second wall perimeter edge, and the second inner wall includes a third wall perimeter edge and a fourth wall perimeter edge, and wherein, the first side cover includes a third first side perimeter edge and a third second side perimeter edge, and the second side cover includes a fourth first side perimeter edge and a fourth second side perimeter edge. The first wall perimeter edge is coupled to the third first side perimeter edge, the second wall perimeter edge is coupled to the fourth first side perimeter edge, the third wall perimeter edge is coupled to the third second side perimeter edge, the fourth wall perimeter edge is coupled to the fourth second side perimeter edge.

In some aspects, the techniques described herein relate to a liquid coupler, wherein the first adaptor component further includes a fixing end. The fixing end, the first inner wall, the second inner wall, the first side cover, and the second side cover respectively extends from an outline perimeter of the fixing end, further defining the first opening.

In some aspects, the techniques described herein relate to a liquid coupler, wherein the fixing component is positioned between the fixing end and a second perimeter edge of the second adaptor component.

In some aspects, the techniques described herein relate to a liquid coupler, wherein the first receiving component further includes a first extension part and a second extension part, and the second receiving component further includes a third extension part and a fourth extension part. The first extension part extends from a first end of the first receiving part, the second extension part extends from a second end of the first receiving part, the third extension part extends from a third end of the second receiving part, and the fourth extension part extends from a fourth end of the second receiving part. The first receiving part, the first extension part, and the second extension part define the first cavity, and the second receiving part, the third extension part and the fourth extension part define the second cavity.

In some aspects, the techniques described herein relate to a liquid coupler, wherein the second adaptor component further includes a housing. The housing extends from the connection part. The housing defines a chamber therewithin and is configured to enable the first liquid line to be positioned therein. The first liquid line is inserted through the first opening and abut inner surfaces of the housing.

In some aspects, the techniques described herein relate to a liquid coupler, wherein the housing includes a first wall, a second wall, a third wall, and a fourth wall. The first extension part and the second extension part respectively protrude from the first wall, and the third extension part and the fourth extension part respectively protrude from the second wall.

In some aspects, the techniques described herein relate to a liquid coupler, wherein the connection part includes male threads, and wherein the second liquid line includes female threads. The connection part fixes the second adaptor component to the second liquid line via rotation.

In some aspects, the techniques described herein relate to a liquid coupler, further including a first sealant member, and wherein the second adaptor component further includes a first groove. The first groove is between the housing and the connection part and the first sealant member is sealably positioned in the first groove. When the second adaptor component is fixed to the second liquid line, the first sealant member is between a second line perimeter edge of the second liquid line and the first groove.

In some aspects, the techniques described herein relate to a liquid coupler, further including a second sealant member, and wherein the chamber includes an inner receiving ledge. The inner receiving ledge protrudes from the inner surfaces of the chamber and the second sealant member is positioned on the inner receiving ledge. The second sealant member is sealably positioned between the inner receiving ledge and a first line perimeter edge of the first liquid line. The second sealant member is configured to deform and fix the first liquid line to the second adaptor component.

In some aspects, the techniques described herein relate to a liquid coupler, wherein the second sealant member includes an adaptor rim and a fixing part. The adaptor rim surrounds the fixing part. The first line perimeter edge of the first liquid line is positioned on the adaptor rim and the fixing part is configured to enable the second sealant member to grip the first liquid line.

In some aspects, the techniques described herein relate to a liquid coupler, wherein the first liquid line includes a square liquid line and the second liquid line includes a round liquid line.

BRIEF DESCRIPTION OF DRAWINGS

Unless specified otherwise, the accompanying drawings illustrate aspects of the innovative subject matter described herein. Referring to the drawings, wherein like reference numerals indicate similar parts throughout the several views, several examples of liquid couplers incorporating aspects of the presently disclosed principles are illustrated by way of example, and not by way of limitation.

DETAILED DESCRIPTION

Figure 1A:
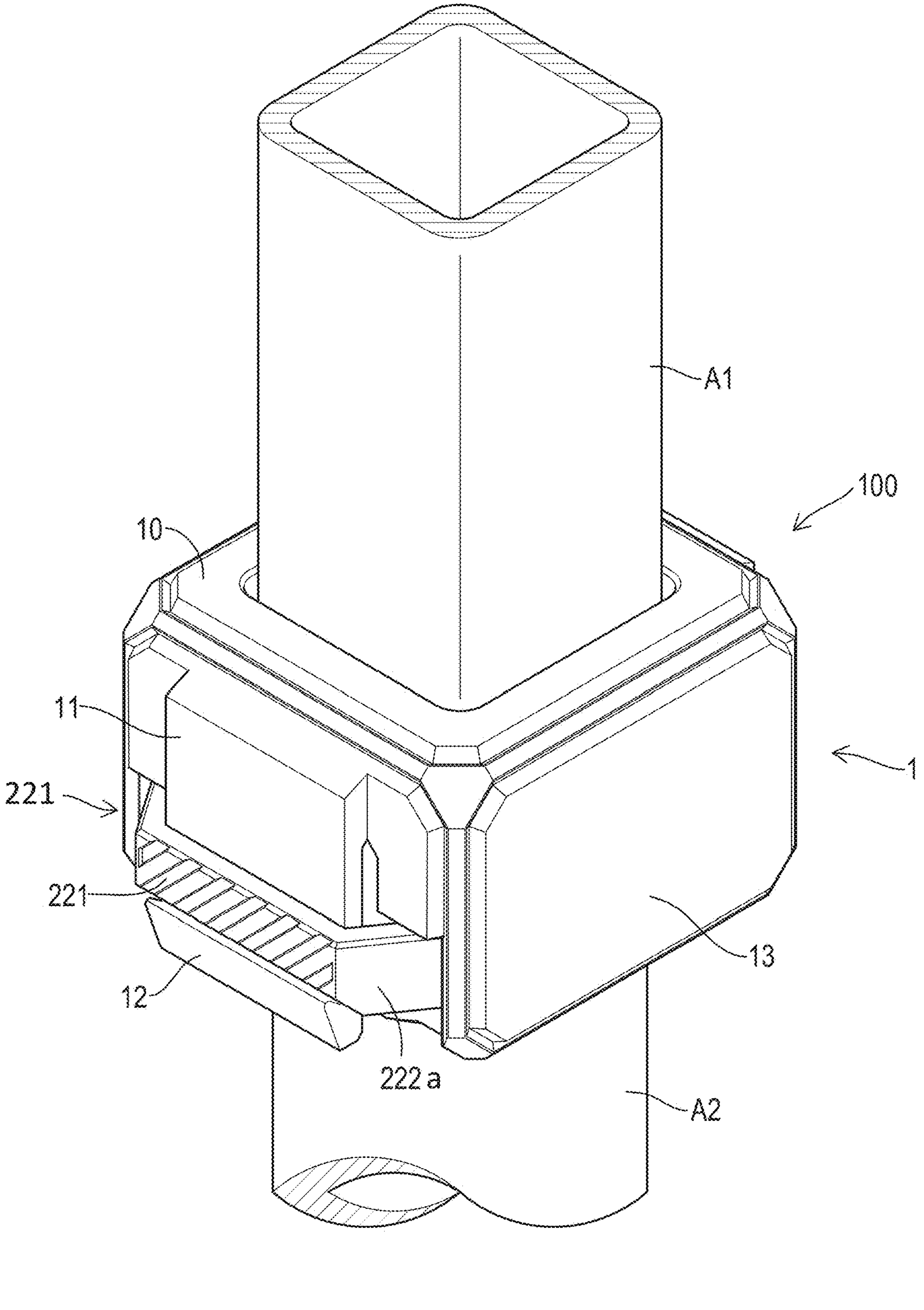
FIG. 1A illustrates a liquid coupler according to one embodiment of the present disclosure.
Figure 1B:
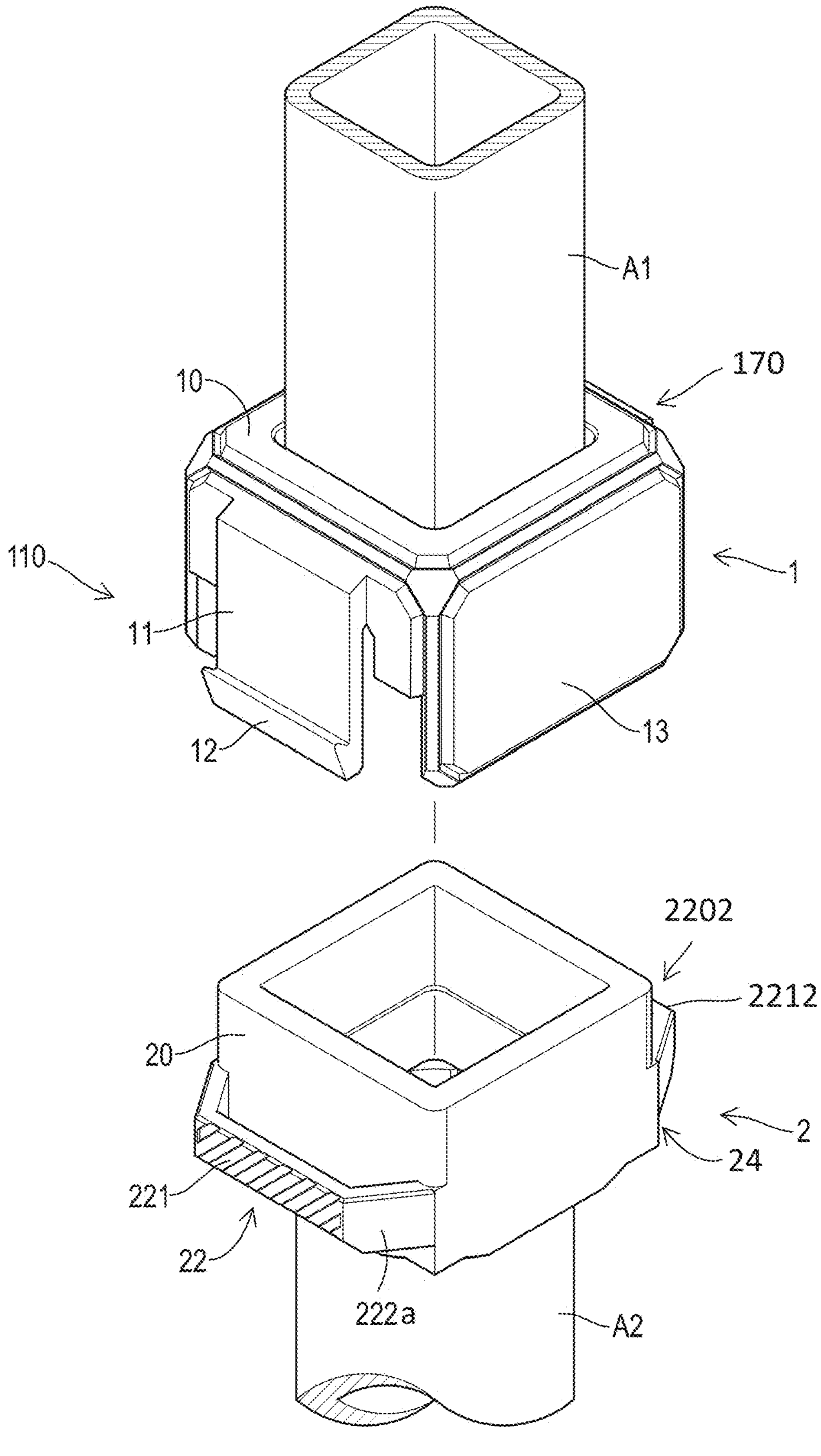
FIG. 1B is a partial exploded view of the liquid coupler of FIG. 1A, according to one embodiment of the present disclosure.
Figure 1C:
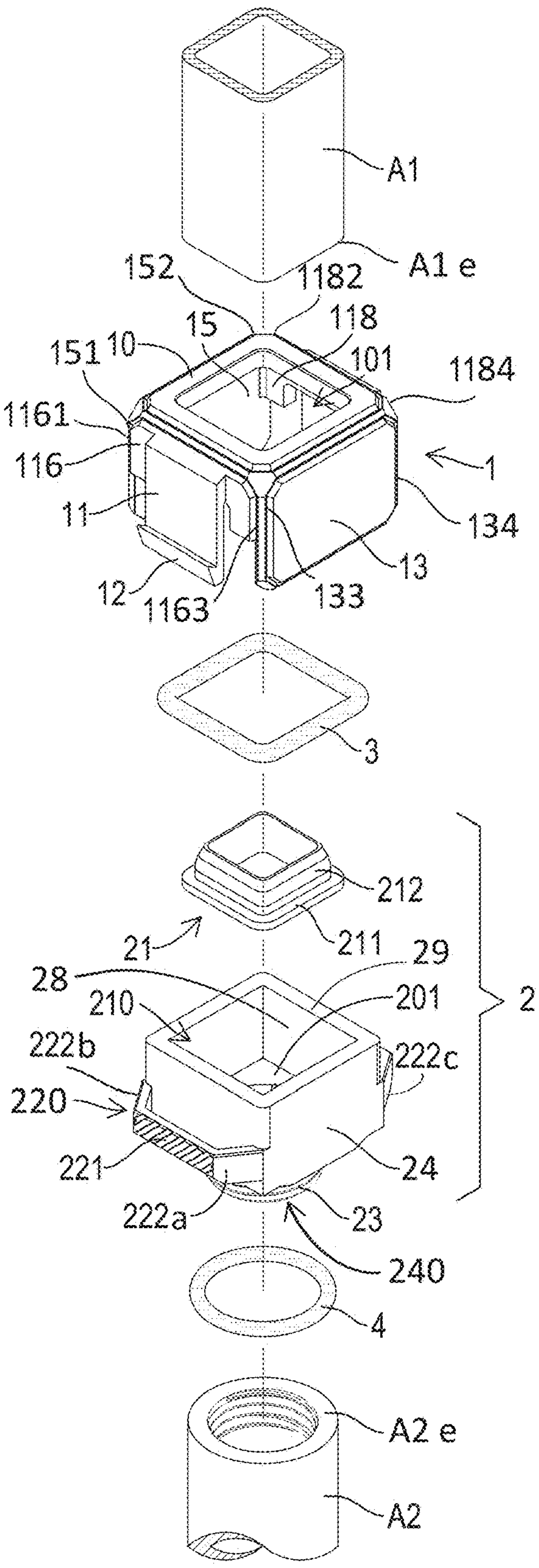
FIG. 1C is an exploded view of the liquid coupler of FIG. 1A, according to one embodiment of the present disclosure.
Figure 1D:
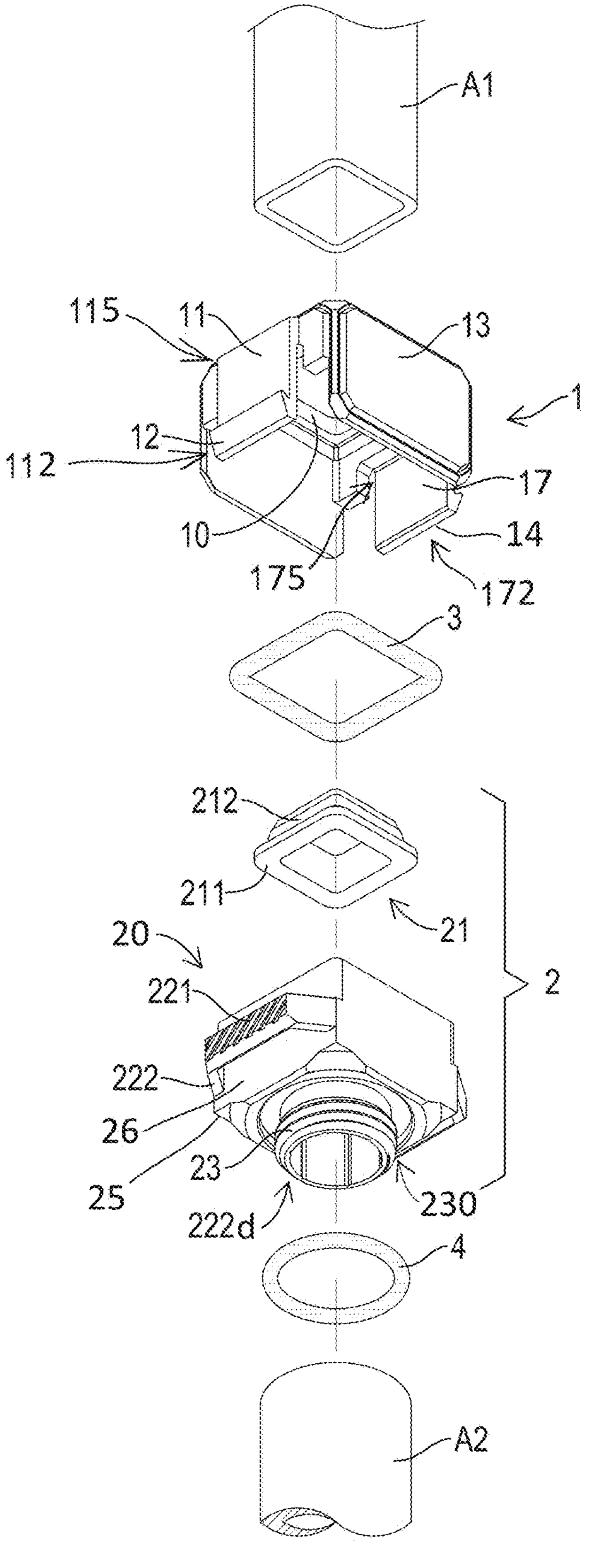
FIG. 1D is another exploded view of the liquid coupler of FIG. 1A, according to one embodiment of the present disclosure.
Figure 2:
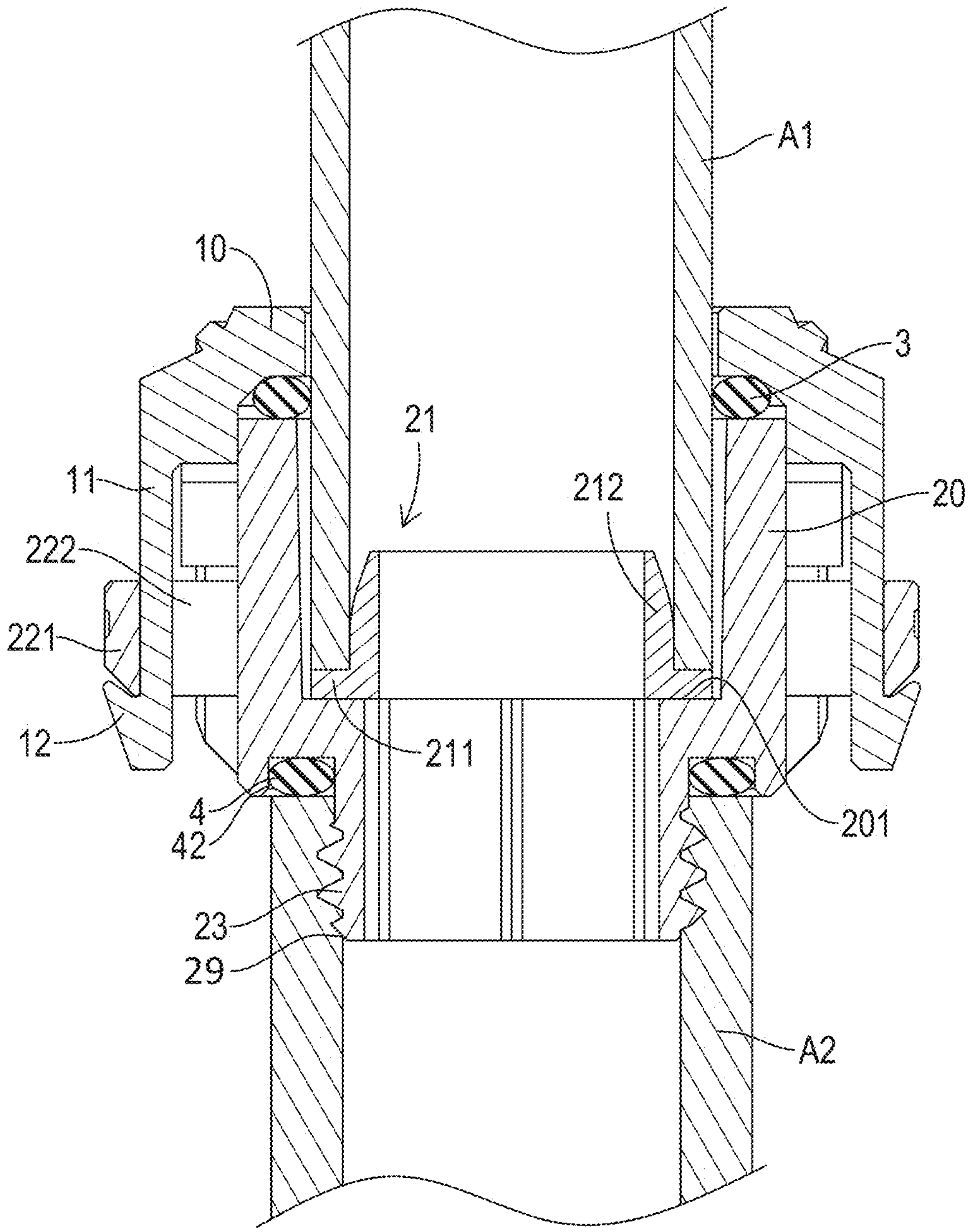
FIG. 2 is a partial cross-section of the liquid coupler of FIG. 1A, according to one embodiment of the present disclosure.

The following describes various principles related to liquid couplers by way of reference to specific examples of adaptor components and connecting assemblies, including specific arrangements and examples of liquid lines embodying innovative concepts. More particularly, but not exclusively, such innovative principles are described in relation to selected examples of fixing components, locking components and receiving components, and well-known functions or constructions are not described in detail for purposes of succinctness and clarity. Nonetheless, of the disclosed principles can be incorporated in various other embodiments of different fixing components, locking components and receiving components to achieve any of a variety of desired outcomes, characteristics, and/or performance criteria.

Thus, fixing components, locking components and receiving components having attributes that are different from those specific examples discussed herein can embody of the innovative principles, and can be used in applications not described herein in detail. Accordingly, embodiments of fixing components, locking components and receiving components not described herein in detail also fall within the scope of this disclosure, as will be appreciated by those of ordinary skill in the relevant art following a review of this disclosure.

Example embodiments as disclosed herein are directed to heat dissipation of packaged and unpackaged integrated circuit components of servers in a data center. A packaged integrated circuit component can comprise one or more integrated circuits mounted on a package substrate. An unpackaged integrated circuit component can comprise one integrated circuit die directly attached to a printed circuit board. Integrated circuit components can comprise a system-on-a-chip (SoC), a central processing unit (CPU), a graphics processing unit (GPU), an accelerator, an I/O controller, a chipset processor, a memory, and a network interface controller. A liquid cooling loop can comprise liquid cold plates, liquid lines (tubing and piping), manifolds, fans, pump(s), expansion tank(s), and a cooling distribution unit.

FIGS. 1A, 1B, 1C, 1D and 2 include at least one embodiment of a liquid coupler 100. The liquid coupler 100, includes a first adaptor component 1, a second adaptor component 2, a fixing component 3, and a plurality of connecting assemblies 110, 170, 220, 2202. The first adaptor component 1 includes a first opening 101. The first opening 101 is disposed through the first adaptor component 1 and configured to enable a first liquid line A1 to be disposed therethrough. The second adaptor component 2 includes a connection part 230. The connection part 230 includes a second opening 240 and is configured to enable the second adaptor component 2 to be fixed to a second liquid line A2. The fixing component 3 is positioned surrounding an outer surface of the first liquid line A1. Each plurality of connecting assemblies 110, 170, 220, 2202 includes a locking component 110, 170 and a receiving component 220, 2202. The locking component 110, 170 coupled to the first adaptor component 1 and the receiving component 220, 2202 is coupled to the second adaptor component 2. The plurality of connecting assemblies 110, 170, 220, 2202 is configured to enable the first liquid line A1 to fluidly couple to the second liquid line A2 via a pushing force. The fixing component 3 is positioned between the first adaptor component 1 and the second adaptor component 2, and when the first adaptor component 1 is locked to the second adaptor component 2, the fixing component 3 is deformed and is configured to fix the first liquid line A1 to the first adaptor component 1. In some embodiments, the first adaptor component 1 and the second adaptor component 2 are made of a plastic material or steel material, or any combination of the foregoing. In some embodiments, the first liquid line A1 and the second liquid line A2 are made of a plastic material or steel material, or any combination of the foregoing. In some embodiments, the first liquid line A1 and the second liquid line A2 are piping lines, tubing lines, or the like.

In some embodiments, the locking component 110, 170 includes a first locking component 110 and a second locking component 170, and the receiving component includes 220, 2202 a first receiving component 220 and a second receiving component 2202. The first locking component 110 is opposite the second locking component 170 and the first receiving component 220 is opposite the second receiving component 2202. The first locking component 110 includes a first deflection part 11 and a first retaining part 12. The first deflection part 11 has a first retaining end 112. The second locking component 170 includes a second deflection part 17 and a second retaining part 14. The second deflection part 17 has a second retaining end 172. The first retaining part 12 protrudes from the first retaining end 112 and the second deflection part 17 protrudes from the second retaining end 172. The first receiving component 220 includes a first receiving part 221 defining a first cavity 22 and the second receiving component 2202 includes a second receiving part 2212 defining a second cavity 24. When the first adaptor component 1 is locked to the second adaptor component 2, the first retaining part 12 is inserted through the first cavity 22 to abut the first receiving part 221 and the second retaining part 14 is inserted through the second cavity 24 to abut the second receiving part 2212 to fluidly couple the first liquid line A1 to the second liquid line A2 via the pushing force.

In some embodiments, the first adaptor component 1 further includes a first inner wall 116, a second inner wall 118, a first side cover 13, and a second side cover 15. The first inner wall 116, the first side cover 13, the second inner wall 118, and the second side cover 15 define the first opening 101.

In some embodiments, the first deflection part 11 further includes a first attachment end 115, and the second deflection part 17 further includes a second attachment end 175. The first attachment end 115 is opposite the first retaining end 112 and the second attachment end 175 is opposite the second retaining end 172. The first deflection part 11 extends outward from the first inner wall 116 at the first attachment end 115. The second deflection part 17 extends outward from the second inner wall 118 at the second attachment end 175. The first attachment end 115 and the second attachment end 175 are configured to respectively enable deflection of the first deflection part 11 and the second deflection part 17 when the first retaining part 12 is inserted through the first cavity 22 and the second retaining part 14 is inserted through the second cavity 24.

In some embodiments, the first inner wall 116 includes a first wall perimeter edge 1163 and a second wall perimeter edge 1161, and the second inner wall 118 includes a third wall perimeter edge 1184 and a fourth wall perimeter edge 1182, and wherein, the first side cover 13 includes a third first side perimeter edge 133 and a third second side perimeter edge 134, and the second side cover 15 includes a fourth first side perimeter edge 151 and a fourth second side perimeter edge 152. The first wall perimeter edge 1163 is coupled to the third first side perimeter edge 133, the second wall perimeter edge 1161 is coupled to the fourth first side perimeter edge 151, the third wall perimeter edge 1184 is coupled to the third second side perimeter edge 134, and the fourth wall perimeter edge 1182 is coupled to the fourth second side perimeter edge 152.

In some embodiments, the first adaptor component 1 further includes a fixing end 10. The fixing end 10, the first inner wall 116, the second inner wall 118, the first side cover 13, and the second side cover 15 respectively extends from an outline perimeter of the fixing end 10, further defining the first opening 101. In some embodiments, the fixing component 3 is positioned between the fixing end 10 and a second perimeter edge 29 of the second adaptor component 2.

In some embodiments, the first receiving component 220 further includes a first extension part **222*a* and a second extension part 222*b*, and the second receiving component 2202 further includes a third extension part 222*c* and a fourth extension part 222*d*. The first extension part 222*a* extends from a first end of the first receiving part 221, the second extension part 222*b* extends from a second end of the first receiving part 221, the third extension part 222*c* extends from a third end of the second receiving part 2212, and the fourth extension part 222*d* extends from a fourth end of the second receiving part 2212. The first receiving part 221, the first extension part 222*a*, and the second extension part 222*b* define the first cavity 22, and the second receiving part 2212, the third extension part 222*c* and the fourth extension part 222*d* define the second cavity 24. In some embodiments, the first receiving part 221 includes one or more first protrusions, and the second receiving component 2202 includes one or more second protrusions. The one or more first protrusions and the one or more second protrusions are configured to enable gripping of the first receiving component 220**.

In some embodiments, the first receiving part (not shown) protrudes from the second adaptor component 2 and is configured to enable the first retaining part to be deformed and abut the first receiving part at a first receiving ledge (not shown) of the receiving part. In some embodiments, the second receiving part (not shown) protrudes from the second adaptor component 2 and is configured to enable the retaining part to be deformed and abut the second receiving part at a second receiving ledge (not shown) of the receiving part.

In some embodiments, the second adaptor component 2 further includes a housing 20. The housing 20 extends from the connection part 230. The housing 20 defines a chamber 210 therewithin and is configured to enable the first liquid line A1 to be positioned therein. The first liquid line A1 is inserted through the first opening 101 and abut inner surfaces of the housing 20. In some embodiments, the housing 20 includes a first wall 26, a second wall 28, a third wall 24, and a fourth wall 25. The first extension part **222*a* and the second extension part 222*b* respectively protrude from the first wall 26, and the third extension part 222*c* and the fourth extension part 222*d* respectively protrude from the second wall 28**.

In some embodiments, the connection part 230 includes male threads 23 and the second liquid line A2 includes female threads 29. The connection part 230 fixes the second adaptor component 2 to the second liquid line A2 via rotation. In some embodiments, the liquid coupler 100, further includes a first sealant member 4, and the second adaptor component 2 further includes a first groove 42. The first groove 42 is between the housing 20 and the connection part 230 and the first sealant member 4 is sealably positioned in the first groove 42. When the second adaptor component 2 is fixed to the second liquid line A2, the first sealant member 4 is between a second line perimeter edge A2*e* of the second liquid line A2 and the first groove 42.

In some embodiments, the liquid coupler 100, further includes a second sealant member 21, and the chamber 210 includes an inner receiving ledge 201. The inner receiving ledge 201 protrudes from the inner surfaces of the chamber 210 and the second sealant member 21 is positioned on the inner receiving ledge 201. The second sealant member 21 is sealably positioned between the inner receiving ledge 201 and a first line perimeter edge Ale of the first liquid line A1. The second sealant member 21 is configured to deform and fix the first liquid line A1 to the second adaptor component 2. In some embodiments, the second sealant member 21 includes an adaptor rim 211 and a fixing part 212. The adaptor rim 211 surrounds the fixing part 212 at a base of the fixing part 212. The first line perimeter edge Ale of the first liquid line A1 is positioned on the adaptor rim 211 and the fixing part 212 is configured to enable the second sealant member 21 to grip the first liquid line A1. In some embodiments, the adaptor rim 211 and the fixing part 212 include a cone-like shape having the adaptor rim 211 as the base and the fixing part 212 as the top cone part. A base diameter of the fixing part 212 at the base is greater than a top diameter of an opposite end of the fixing part 212. In some embodiments, the fixing part 212 further includes one or more radial ridges. The cone-like shape is configured to enable the first line perimeter edge Ale to gradually deform the second sealant member 21 for sealability. The one or more radial ridges (or barbs) enhances gripping and sealability of the first liquid line A1.

In some embodiments, the first adaptor component 1 is integrally formed, and second adaptor component 2 is integrally formed. In some embodiments, the first liquid line A1 includes a square liquid line and the second liquid line A2 includes a round liquid line. In some embodiments, the first liquid line A1 includes a round liquid line and the second liquid line A2 includes a round liquid line. In some embodiments, the first liquid line A1 includes a round liquid line and the second liquid line A2 includes a square liquid line. In some embodiments a cross-sectional shape of the square liquid line is a non-square polygonal cross-sectional shape.

Figure 3:
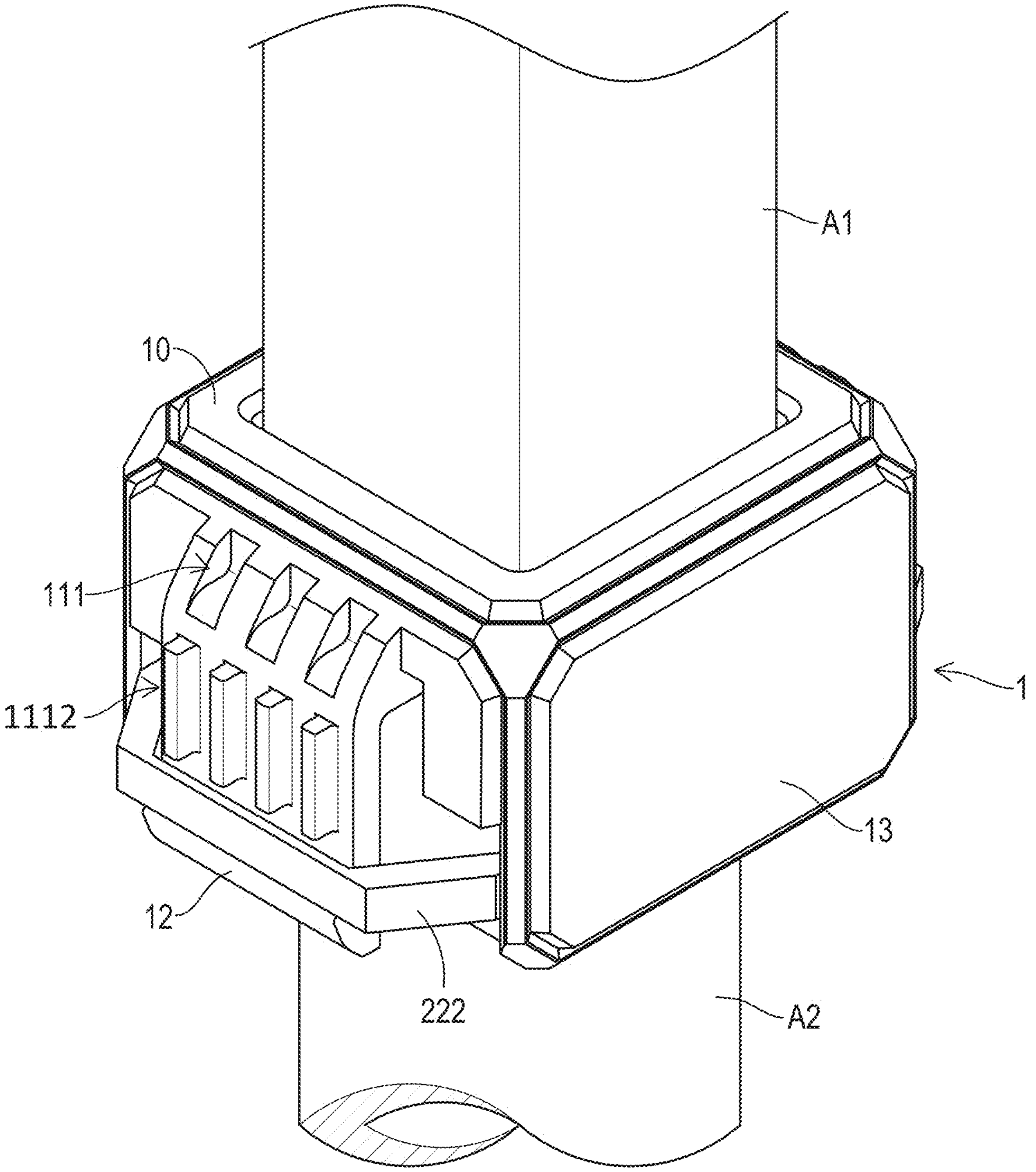
FIG. 3 illustrates another liquid coupler according to one embodiment of the present disclosure.
Figure 4:
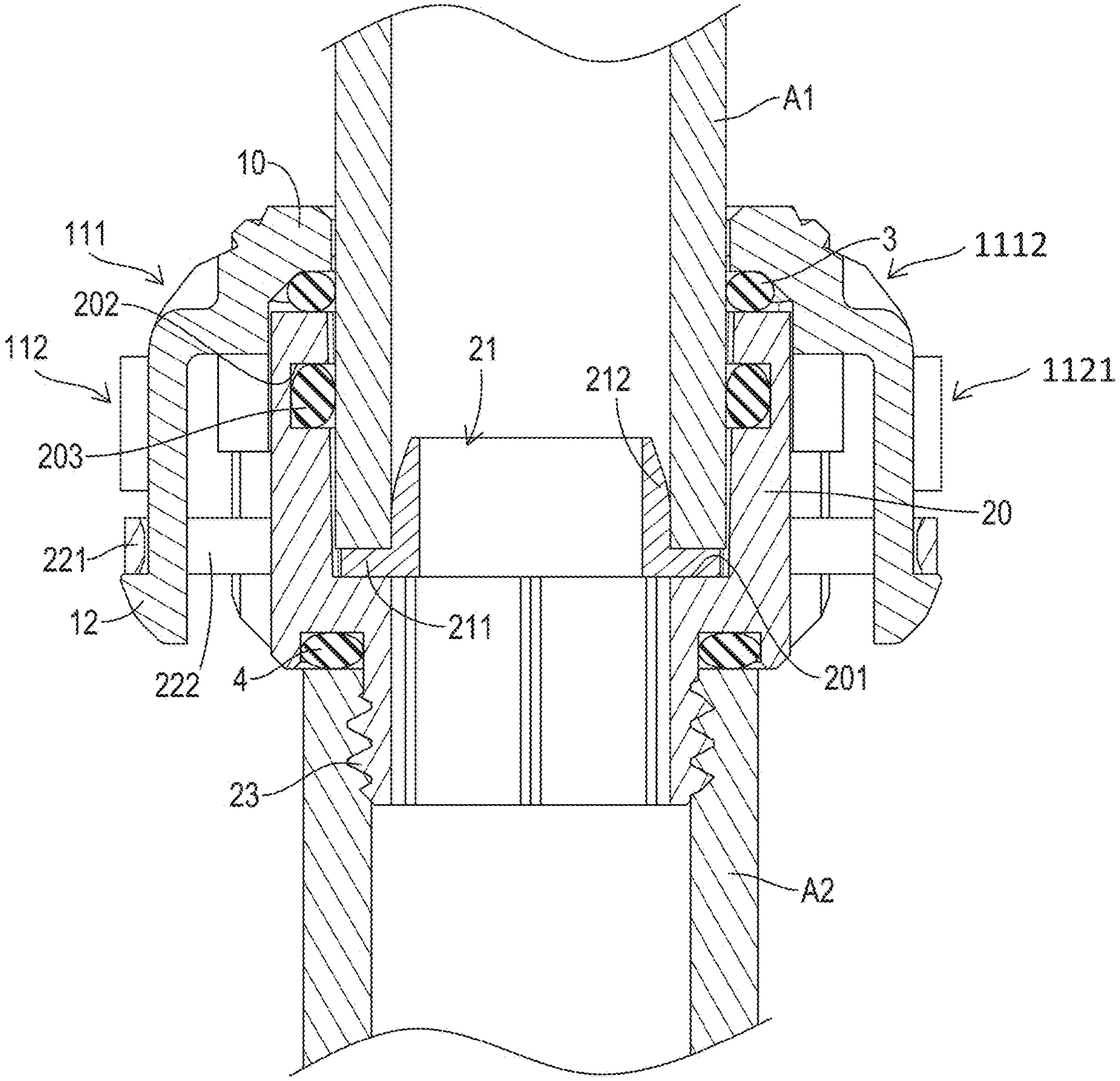
FIG. 4 is a partial cross-section of the liquid coupler of FIG. 3, according to one embodiment of the present disclosure.

In some embodiments, the first deflection part 11 further includes a plurality of first positioning members 1112 and a plurality of first deflection part grooves 111, and the second deflection part 17 further includes a plurality of second positioning members 1121 and a plurality of second deflection part grooves 1112. FIGS. 3 and 4 include at least another embodiment of a liquid coupler 100. The plurality of first deflection part grooves 111 is disposed in a second first row and the plurality of first positioning members 1112 is disposed in a first first row. The plurality of second deflection part grooves 1112 is disposed in a second second row and the plurality of second positioning members 1121 is disposed in a first second row. The plurality of first positioning members 1112 is configured to enable the first retaining part 12 to stop from moving when inserted through the first cavity 22 and the plurality of second positioning members 1121 is configured to enable the second retaining part 14 to stop from moving when inserted through the second cavity 24.

In some embodiments, the liquid coupler 100, further includes a third sealant member 203, and the second adaptor component 2 further includes a second groove 202. The third sealant member 203 is sealably positioned in the second groove 202. When the second adaptor component 2 is fixed to the second liquid line A2 and the first adaptor component 1 is locked to the second adaptor component 2, the third sealant member 203 is between the second groove 202 and the first liquid line A1.

In some embodiments, the first sealant member 4, the second sealant member 21, and the third sealant member 203 are made of elastomeric materials; as an example, rubber.

The liquid coupler 100 of the embodiments described herein provide an efficient connect and release, and minimal operational footprint liquid coupler 100 for connecting a square liquid line to a round liquid line. To fluidly couple the first liquid line A1 (square liquid line) to the second liquid line A2 (round liquid line), the second adaptor component 2 is fixed to the second liquid line A2, the first liquid line A1 is positioned on the inner receiving ledge 201, and the first retaining part 12 is inserted through the first cavity 22 and the second retaining part 14 is inserted through the second cavity 24. To uncouple the first liquid line A1 from the second liquid line A2, the first retaining part 12 and the second retaining part 14 are respectively pushed inward, enabling the first retaining part 12 and the second retaining part 14 to respectively detach from the first cavity 22 and the second cavity 24. Liquid-tight coupling and detaching of the first liquid line A1 to the second liquid line A2 is easy, quick, and without any need for special tools or equipment, and without any need for multiple steps. Furthermore, liquid-tight seals are achieved with the first sealant member 4 sealably positioned between the second line perimeter edge A2*e* and the first groove 42, and the second sealant member 21 sealably positioned between the inner receiving ledge 201 and the first line perimeter edge Ale, and the third sealant member 203 sealably positioned between the first liquid line A1 and the second groove 202 to prevent leakage of the liquid coupler 100. Yet furthermore, the first liquid line A1 is fixed to the first adaptor component 1 via deformation of the fixing component 3 when the fixing component 3 is positioned between the fixing end 10 and the second perimeter edge 29, and the first adaptor component 1 is locked to the second adaptor component 2. The locking of the first adaptor component 1 to the second adaptor component 2 fixes the first liquid line A1 to the first adaptor component 1 without separate securing steps or additional components. Moreover, the first liquid line A1 is fixed to the second adaptor component 2 as the one or more radial ridges of the fixing part 212 provide a pushing force against the first liquid line A1 toward the inner surfaces of the chamber 210, and the first adaptor component 1 is locked to the second adaptor component 2. The locking of the first adaptor component 1 to the second adaptor component 2 fixes the first liquid line A1 to the second adaptor component 2 without separate securing steps or additional components. Different combinations of fluidly coupling square and round liquid lines together are available, making implementation and maintenance of square and round liquid lines easier and more efficient.

Therefore, embodiments disclosed herein are well adapted to attain the ends and advantages mentioned as well as those that are inherent therein. The particular embodiments disclosed above are illustrative only, as the embodiments disclosed may be modified and practiced in different but equivalent manners apparent to those of ordinary skill in the relevant art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some number. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean than one of the element that it introduces.

The invention claimed is:

1. A liquid coupler, comprising:

a first adaptor component including a first opening having a polygonal cross-section with a plurality of flat sides, the first opening disposed through the first adaptor component, the first opening configured to enable a first liquid line to be disposed therethrough;

a second adaptor component including a connection part, the connection part includes a second opening, the connection part configured to enable the second adaptor component to be fixed to a second liquid line;

a fixing component surrounding an outer surface of the first liquid line; and a plurality of connecting assemblies, each connecting assembly including a locking component coupled to the first adaptor component, and a receiving component coupled to the second adaptor component, wherein:

the receiving component includes a cavity having a polygonal inner surface corresponding to the polygonal cross-sectional shape, the locking component includes a retaining portion disposed along a perimeter of the polygonal cross-sectional shape and contacting the polygonal inner surface of the cavity, and the fixing component includes a plurality of contact regions circumferentially spaced and aligned with the flat sides of the polygonal cross-sectional shape.

2. The liquid coupler of claim 1, wherein:

the plurality of connecting assemblies define two connecting assemblies that includes a first locking component, a second locking component, a first receiving component and a second receiving component, wherein the first locking component opposite the second locking component, and the first receiving component opposite the second receiving component;

the first locking component includes a first deflection part and a first retaining part, and the first deflection part has a first retaining end;

the second locking component includes a second deflection part and a second retaining part, the second deflection part has a second retaining end;

the first retaining part protrudes from the first retaining end, the second deflection part protrudes from the second retaining end; and the first receiving component includes a first receiving part defining a first cavity, and the second receiving component includes a second receiving part defining a second cavity, wherein, when the first adaptor component is locked to the second adaptor component, the first retaining part is inserted through the first cavity to abut the first receiving part and the second retaining part is inserted through the second cavity to abut the second receiving part to fluidly couple the first liquid line to the second liquid line via the pushing force.

3. The liquid coupler of claim 2, wherein the first deflection part further includes a plurality of first positioning members and a plurality of first deflection part grooves, and the second deflection part further includes a plurality of second positioning members and a plurality of second deflection part grooves, wherein:

the plurality of first deflection part grooves are disposed in a second first row and the plurality of first positioning members disposed in a first row, the plurality of second deflection part grooves are disposed in a second row and the plurality of second positioning members disposed in a first second row, the plurality of first positioning members are configured to enable the first retaining part to stop from moving when inserted through the first cavity, and the plurality of second positioning members are configured to enable the second retaining part to stop from moving when inserted through the second cavity.

4. The liquid coupler of claim 3, further comprising a third sealant member, and wherein the second adaptor component further includes a second groove, the third sealant member sealably positioned in the second groove, when the second adaptor component is fixed to the second liquid line and the first adaptor component is locked to the second adaptor component, the third sealant member is between the second groove and the first liquid line.

5. The liquid coupler of claim 2, wherein the first adaptor component further includes a first inner wall, a second inner wall, a first side cover, and a second side cover, wherein the first inner wall, the first side cover, the second inner wall, and the second side cover define the first opening.

6. The liquid coupler of claim 5, wherein the first deflection part further includes a first attachment end, the first attachment end opposite the first retaining end, and wherein the second deflection part further includes a second attachment end, the second attachment end opposite the second retaining end, the first deflection part extends outward from the first inner wall at the first attachment end, and the second deflection part extends outward from the second inner wall at the second attachment end, the first attachment end and the second attachment end configured to respectively enable deflection of the first deflection part and the second deflection part when the first retaining part is inserted through the first cavity and the second retaining part is inserted through the second cavity.

7. The liquid coupler of claim 5, wherein the first inner wall includes a first wall perimeter edge and a second wall perimeter edge, and the second inner wall includes a third wall perimeter edge and a fourth wall perimeter edge, and wherein, the first side cover includes a third first side perimeter edge and a third second side perimeter edge, and the second side cover includes a fourth first side perimeter edge and a fourth second side perimeter edge, the first wall perimeter edge coupled to the third first side perimeter edge, the second wall perimeter edge coupled to the fourth first side perimeter edge, the third wall perimeter edge coupled to the third second side perimeter edge, the fourth wall perimeter edge coupled to the fourth second side perimeter edge.

8. The liquid coupler of claim 5, wherein the first adaptor component further includes a fixing end, wherein the fixing end, the first inner wall, the second inner wall, the first side cover, and the second side cover respectively extends from an outline perimeter of the fixing end, further defining the first opening.

9. The liquid coupler of claim 8, wherein the fixing component is positioned between the fixing end and a second perimeter edge of the second adaptor component.

10. The liquid coupler of claim 5, wherein the first receiving component further includes a first extension part and a second extension part, and the second receiving component further includes a third extension part and a fourth extension part, the first extension part extends from a first end of the first receiving part, the second extension part extends from a second end of the first receiving part, the third extension part extends from a third end of the second receiving part, and the fourth extension part extends from a fourth end of the second receiving part, wherein the first receiving part, the first extension part, and the second extension part defines the first cavity, and the second receiving part, the third extension part and the fourth extension part defines the second cavity.

11. The liquid coupler of claim 10, wherein the second adaptor component further includes a housing, the housing extends from the connection part, the housing defining a chamber therewithin, the housing configured to enable the first liquid line to be positioned therein, the first liquid line is inserted through the first opening and abut inner surfaces of the housing.

12. The liquid coupler of claim 11, wherein the housing includes a first wall, a second wall, a third wall, and a fourth wall, the first extension part and the second extension part respectively protrude from the first wall, wherein the third extension part and the fourth extension part respectively protrude from the second wall.

13. The liquid coupler of claim 11, wherein the connection part includes male threads, and wherein the second liquid line includes female threads, the connection part fixes the second adaptor component to the second liquid line via rotation.

14. The liquid coupler of claim 13, further comprising a first sealant member, and wherein the second adaptor component further includes a first groove, the first groove between the housing and the connection part, the first sealant member sealably positioned in the first groove, when the second adaptor component is fixed to the second liquid line, the first sealant member is between a second line perimeter edge of the second liquid line and the first groove.

15. The liquid coupler of claim 11, further comprising a second sealant member, and wherein the chamber includes an inner receiving ledge, the inner receiving ledge protrudes from the inner surfaces of the housing, the second sealant member positioned on the inner receiving ledge, the second sealant member sealably positioned between the inner receiving ledge and a first line perimeter edge of the first liquid line, the second sealant member is configured to deform and fix the first liquid line to the second adaptor component.

16. The liquid coupler of claim 15, wherein:

the second sealant member includes an adaptor rim and a fixing part;

the adaptor rim surrounds the fixing part;

the first line perimeter edge of the first liquid line is positioned on the adaptor rim, wherein the fixing part is configured to enable the second sealant member to grip the first liquid line.

17. The liquid coupler of claim 1, wherein the first liquid line includes a square liquid line and the second liquid line includes a round liquid line.

* * * * *